United States Patent Office 3,586,569
Patented June 22, 1971

3,586,569
SEALING OF SURFACE SULFONATED PLASTIC SHAPED ARTICLES
Robert J. Caiola, Saginaw, Mich., assignor to The Dow Chemical Company, Midland, Mich.
No Drawing. Filed Apr. 23, 1969, Ser. No. 818,817
Int. Cl. C09j 3/00
U.S. Cl. 156—308                          7 Claims

ABSTRACT OF THE DISCLOSURE

Surface sulfonated shaped articles of thermoplastic organic polymers are sealed at temperatures below the heat distortion temperature of the polymer by (1) treating at least a portion of the article surface with a liquid which is a non-solvent for the base polymer and a solvent for the sulfonated polymer on the surface, e.g., water, (2) positioning the treated surface against another surface of surface sulfonated shape article such that the liquid is disposed therebetween and (3) removing the liquid at temperatures below the heat distortion point of the polymer. The above sealing method is reversible in that soaking the sealed portion of shaped article in a suitable sealing liquid releases the seal without damaging the article.

BACKGROUND OF THE INVENTION

This invention relates to the art of sealing surface sulfonated shaped articles of thermoplastic organic polymers, and more particularly, to methods for sealing such shaped articles at temperatures below the heat distortion point of such polymers.

It has been a practice in the art to improve the adhesion of a number of smooth, relatively slippery films or other shaped articles of thermoplastic polymers, particularly the polyolefins, by surface sulfonating the shaped article. While the resultant surface sulfonated article exhibits greatly improved adhesion, the adhesion is not of a sufficient degree to enable the article to form the very strong seals which are often required in various applications, particularly packaging applications.

In order to form such seals, it has generally been a practice to bond surface sulfonated sheets of polymer to each other using one of two general techniques. According to one technique, an adhesive material is applied to the surfaces of the sheets to be bonded; the sheets are placed in contact; and heat and/or pressure are applied to form a secure bond. In accordance with the second general technique, the surfaces of the sheets are placed in contact with one another and sufficient heat and pressure are applied to melt or soften the thermoplastic material. Both of the above techniques generally require temperatures so high that the resultant seal of thermoplastic polymer has poor esthetic appeal and exhibits degraded function properties or distorted appearance. Such losses in desirable film or sheet properties are often a result of heat shrink. These problems are acute with oriented surface sulfonated films or sheets, particularly the biaxially oriented, surface sulfonated sheets or other shaped articles of styrene polymers. The technique requiring the use of adhesive suffers from the additional problems caused by the effects of the adhesive on the polymer sheet, for example, increased blocking, brittle seals and increased opacity. Furthermore, adhesives which are or include good solvents for the base polymer often produce cracks in the sheet, so-called crazing.

In view of the problems occurring in techniques previously used for sealing surface sulfonated shape articles of thermoplastic organic polymers, it would be highly desirable to provide a tractable method for economically sealing such articles which method requires moderate pressure and temperature below the heat distortion point of the polymer, preferably below temperatures which characteristically cause heat shrink of the shaped article.

SUMMARY OF THE INVENTION

In accordance with the present invention surface sulfonated shaped articles of normally solid, water-insoluble, thermoplastic organic polymers are sealed together to form secure, essentially transparent bonds by a method comprising the steps of (1) wetting a surface of a surface sulfonated article of a normally solid, water-insoluble, thermoplastic organic polymer with a liquid which is a non-solvent for the thermoplastic organic base polymer and a solvent for the sulfonated polymer on the surface; (2) placing the wetted surface in contact with another surface of surface sulfonated article to form contiguous surfaces with the liquid disposed therebetween; and (3) subsequently removing the liquid while maintaining the resulting contiguous structure. Advantageously the liquid is removed by applying force to cause the contiguous surfaces to press against each other and heating said surfaces until the liquid is vaporized. It is required, however, that the internal temperature of the articles of polymer does not reach the heat distortion point of the polymer. The resultant seals are secure, essentially transparent bonds in which the properties of the surface sulfonated polymer are not deleteriously affected. In addition, such seals are impervious to air and are at least equal in strength to that of the articles being sealed.

The above method for sealing such articles is a reversible one in that the seal may be reopened without destruction or distortion of the shaped articles by soaking the sealed portion in the sealing liquid, as described above and hereinafter in more detail. Following reopening, the sealing operation can be effectively repeated.

Surface sulfonated shaped articles of polymers treated in accordance with the method of this invention may be employed in a wide variety of uses, for example, those which require a sealable transparent sheet material, such as a box overwrap in the packaging art. The method of this invention is particularly useful in the production of packages for food, clothing and other articles for which an entirely transparent package is desirable.

DESCRIPTION OF THE PREFERRED EMBODIMENTS

Shaped articles sealed in the practice of this invention are fabricated from normally solid, water-insoluble thermoplastic organic polymers. Suitable examples are polymers of the following monomers: the monoolefins and conjugated diolefins, e.g., ethylene, propylene, butene-1, iso-butene, 1,3-butadiene, isoprene and other aliphatic mono- and diolefins; the halogen substituted olefins, e.g., vinyl chloride, vinylidene chloride and the like; the monovinylidene aromatic compounds, e.g., styrene, $\alpha$-methylstyrene, ar-methylstyrene, chlorostyrene and other aromatic olefins; the unsaturated carboxylic acid esters including the esters of $\alpha,\beta$-ethylenically unsaturated carboxylic acids such as ethyl acrylate, methyl methacrylate, butyl acrylate, propyl itaconate, iso-butyl acrylate, ethyl maleate, methyl fumarate, etc., and the unsaturated esters of saturated carboxylic acids such as vinyl acetate, vinyl propionate, vinyl butyrate, 2-propenyl acetate, and the like; the $\alpha,\beta$-ethylenically unsaturated carboxylic acids, e.g., acrylic acid, methacrylic acid, maleic acid and anhydride, fumaric acid, itaconic acid, and the like; and other vinyl compounds, e.g., acrylonitrile, acrylamide, methyl vinyl ether and the like. Also icluded are the polyamides such as nylon, chlorinated polyolefins such as chlorinated polyethylene, polyethylene terephthalate, and the like. Of particular interest in the practice of this invention are polyethylenes, ethylene/vinyl acetate copolymers, ethylene/ethyl acrylate copolymers, ethylene/acrylic acid copolymers, ethylene/iso-butyl acrylate copolymers, polypropylenes, ethylene/propylene copolymers, propylene/butene-1 copolymers, polyvinyl chloride, vinyl chloride copolymers, vinylidene chloride/acrylonitrile copolymers, vinylidene chloride/vinyl chloride copolymers, copolymers of vinylidene chloride with acrylic acid, methacrylic acid or their ester derivatives, polystyrene, styrene/1,3-butadiene copolymers, nylon, chlorinated polyethylenes, polyethylene terephthalate and the like. Preparation of such polymers is well known to those skilled in the art, and therefore is not described.

By the term "shaped article" is meant various fabricated articles including sheets, films, fibers, foils, filaments, yarns, threads, ribbons, tapes, moldings and the like. Processes for fabricating such shaped articles from the above-described polymers include extrusion, compression and injection molding and the other conventional techniques. Shaped articles preferably utilized are sheets or films fabricated by extruding the polymer through an annular die, blowing the extruded tube into the form of a bubble or tube having a wall of the desired thickness, cooling, collapsing and cutting the biaxially oriented sheet into the desired dimensions. Alternatively the sheet or film is prepared by extrusion through a slit die followed by stretching the film to give desired orientation. Typical surface sulfonated sheets of polymer have thicknesses ranging from about 0.3 to about 20 mils.

Surface sulfonation of the shaped article is effected by one of several methods commonly used in surface sulfonating polymers. For example, the surface of the shaped article or the polymer prior to shaping is subjected to the action of a sulfonating reagent such as concentrated sulfuric acid, usually containing at least 80 weight percent of sulfuric acid, free sulfur trioxide, or a solution of sulfur trioxide in an inert solvent such as aliphatic hydrocarbons and halogenated aliphatic hydrocarbons, e.g., methylene chloride, chloroform, pentane, hexane and the like. It is understood that surface sulfonation may be suitably carried out by contacting said surfaces with oleum, anhydrous solutions of oleum and free sulfur trioxide, aliphatic hydrocarbons containing chlorosulfonic acid and the like. More complete descriptions of suitable surface sulfonation processes are set forth in U.S. 2,832,698 and U.S. 2,937,066.

A satisfactory degree of surface sulfonation is that amount which imparts the required polar characteristics to the surface of the article, but does not physically degrade the article. In most embodiments the surface sulfonated articles advantageously have from about 0.04 to about 1000 micrograms of sulfur trioxide equivalents per square centimeter of surface. Preferred surface sulfonated articles have from about 0.10 to about 3.0 micrograms of sulfur trioxide equivalents per square centimeter. A satisfactory degree of surface sulfonation is obtained by carrying out the sulfonation process at temperatures between the freezing point of the sulfonating reagent and about 150° C. for periods of time ranging from a matter of seconds, or even almost instantaneous periods involving mere fractions of a second, to hours.

It is understood that the sulfur trioxide groups may be in the from of —$SO_3H$ or —$SO_3^{\ominus\oplus}M$ wherein M is a cation such as an alkali metal, an alkaline earth metal and the like.

Liquids which effectively lower the temperatures required to seal the surface sulfonated article, but which do not adversely affect the article's physical characteristics are liquids which are non-solvents for the thermoplastic organic base polymer and which are solvents for the sulfonated polymer on the surface. Generally, such liquids have solubility parameters of at least 12 at 25° C.

Solubility parameter ($\delta$) of a non-electrolyte, as defined in Hildebrande and Scott, The Solubility of Non-Electrolytes, 3rd ed., Reinhold Publishing Co., New York, 1949, is determined using the formula: $\delta=(\Delta E/V)^{1/2}$ wherein $\Delta E$ is the enthalpy of the non-electrolyte at 25° C. and 760 mm. and V is the molecular volume calculated by dividing density of the non-electrolyte by its molecular weight. From the teachings of Hildebrande and Scott and others, it is known that non-electrolytes having approximately equal solubility parameters are generally soluble in one another, whereas non-electrolytes having substantially different solubility parameters are generally insoluble in one another.

Generally thermoplastic organic polymers, particularly the polymers suitable as the base polymers in this invention, have solubility parameters significantly less than 12, usually from about 8 to about 10 at 25° C. If a liquid having a solubility parameter less than 12 at 25° C. is used to seal the polymer article, the liquid, which is generally a solvent for the polymer, crazes or otherwise deleteriously affects the polymer's physical characteristics. Therefore, it is necessary to use a liquid which is essentially a non-solvent for the base polymer. Liquids having solubility parameters of at least 12 at 25° C. are generally such non-solvents. In addition, the sulfonated polymers on the surfaces of the shaped articles generally possess solubility parameters at 13 to 15 or higher. Therefore the liquid, in order to be a solvent for the sulfonated polymer, generally must have a solubility parameter of at least 12 at 25° C.

Preferred liquids are generally low boiling liquids such as water and dilute aqueous solutions of volatile acids and bases. It is understood that dilute solutions of non-volatile bases may also be employed; but, if such non-volatile bases are employed, it is desirable to use only an amount of non-volatile sufficient to neutralize the sulfonic acid group or to wash away any excess base that remains. Also preferred are the aliphatic alcohols, methanol and ethanol. The low boiling character of the preferred liquids facilitates rapid removal of liquid from the surface of the shaped article, thereby effecting a quick seal at temperatures substantially below the heat distortion point of the polymer.

Operable liquids include N,N-dimethylformamide, N-methylformamide, dimethyl sulfoxide, diethylsulfone and the like. These operable liquids have somewhat higher boiling points and are believed to leave the surface of the shaped article by migrating into the inner portion of the shaped article. Such migration sometimes causes a slight haziness in the resulting seal.

In carrying out the method of this invention, a suitable liquid is advantageously applied to a surface of the surface sulfonated shaped article using any conventional technique. For example, the surface sulfonated article is easily wetted with such liquids by rolling, dipping, spraying, brushing, wicking and the like. It is understood that only the portion of the article surface where sealing is desired needs to be contacted with the liquid. Furthermore, it is only required that the liquid be applied in a manner such that the portion of article surface is barely moistened or wetted with the liquid. However, it is generally preferred to apply an essentially continuous layer of liquid to the portion of article surfaced to be sealed.

Following the application of liquid and before the liquid evaporates from the article surface, the wetted surface is placed in contact with another surface of a surface sulfonated shaped article, which surface may be dry or wetted with a suitable liquid. The surfaces of shaped article or shaped articles are contiguous with the liquid disposed therebetween.

The articles are then sealed together by maintaining the contiguous structure and subjecting the structure to temperatures ranging from about room temperature to about 120° C. until essentially all of the liquid is removed from the contiguous surfaces, provided however, that internal temperature of the polymer article does not reach the heat distortion temperature of said polymer. Times required to remove the liquid vary with the temperatures used and the properties of the liquid; usually if the articles are sealed at room temperature about 4 to 16 hours is required, and if sealed at temperatures from about 65° C. to about 100° C., from 1 minute to 10 minutes is required.

films, except that a jaw temperature of 85° C. and a sealing period of 2 minutes is used. The results are shown in Table II.

TABLE II

| Example No. | Polymer | Film thickness, mils | Degree of sulfonation, microgram/cm.² | Seal [1] |
|---|---|---|---|---|
| 8 | Polystyrene | 2.5 | 0.12 | Good. |
| 9 | do | 1 | 0.33 | Do. |
| 10 | do | 5 | 0.45 | Do. |
| 11 | Polyethylene | 1 | 0.45 | Fair. |
| 12 | do | 1 | 2.2 | Good. |
| 13 | Vinylidene chloride/vinyl chloride copolymer | 1.8 | 0.13 | Do. |
| 14 | Polypropylene | 1 | 0.17 | Fair. |
| 15 | Ethylene/vinyl acetate copolymer | 0.5 | 0.16 | Good. |
| 16 | Polyethylene terephthalate | 1 | 0.15 | Do. |

[1] Good=seal is not broken without distorting the film. Fair=strength of seal is slightly less than the tensile strength of the film.

The following examples are given to illustrate the invention and should not be construed as limiting its scope. In addition, all parts and percentages are by weight unless otherwise indicated.

EXAMPLE 1

A polystyrene film having thickness of 3 mils and 0.8 microgram of sulfur trioxide equivalents/cm.² is wetted with water and a second piece of the same film is brought into contact with the wetted surface. The wetted surface is readily bonded to the second piece with a heat sealer.

The films are sealed together at jaw pressure of 40 p.s.i. at 80–90° C. in a time of one minute. The resultant seal is transparent and the film tears before the seal is broken. In addition, the sealed film exhibits no cracks, brittleness, distortion or heat shrinkage as a result of the sealing operation. Equivalent seals are obtained using the same pressure means at 65° C. for 10 minutes. Such seals are also obtained at room temperature overnight by maintaining contact, but without using pressure.

The sealed portion is placed in a vessel of water at room temperature for 10 minutes. Upon removal of the sealed portion from the vessel, the pieces of film are separated without tearing or otherwise distorting the film.

The sealing operation described above is then repeated with the same pieces of film to provide a seal which cannot be broken without tearing the film.

EXAMPLES 2–6

The procedures of Example 1 are repeated using different liquids for sealing the film described in Example 1. The results are shown in Table I.

TABLE I

| Example No. | Liquid | Seal [1] |
|---|---|---|
| 2 | Methanol | Good. |
| 3 | Ethanol | Do. |
| 4 | Dilute hydrochloric acid | Do. |
| 5 | Dimethyl sulfoxide | Do.[2] |
| 6 | Dimethyl formamide | Do.[2] |

[1] Good=film tears before seal is broken.
[2] A slight haziness occurs in the sealed portion when the film is sealed at 80–90° C., but does not occur when the sealing operation is carried out at room temperature.

When solvents for polystyrene such as benzene, toluene and the like are used in the procedure of Example 1, the resultant seals are very weak, i.e., pull apart without tearing the film, and the sealed portions are noticeably weakened, crazed and distorted.

EXAMPLES 8–16

The sealing procedure of Example 1 is substantially repeated to seal different surface sulfonated polymer Good seals are also observed between the following different surface sulfonated films:

polystyrene to polypropylene,
polystyrene to vinylidene chloride/vinyl chloride copolymer,
ethylene/vinyl acetate to polyethylene terephthalate, and others when sealed in accordance with the method of this invention.

What is claimed is:

1. A method for sealing together surface sulfonated shaped articles of normally solid, water-insoluble, thermoplastic organic polymer at temperatures below the heat distortion point of the polymer, said method comprising the steps of (1) wetting at least a portion of a surface sulfonated article surface with a liquid which is a non-solvent for the polymer and a solvent for the sulfonated polymer on the surface of the shaped article; (2) placing the wetted surface in contact with another surface sulfonated article surface to form contiguous surfaces with the liquid disposed therebetween; and (3) subsequently removing the liquid while maintaining the resulting contiguous structure, thereby forming a secure, essentially transparent seal.

2. The method according to claim 1 wherein step (3) comprises (a) maintaining the resulting contiguous structure and (b) subjecting the structure to temperatures ranging from about room temperature to about 120° C. until essentially all of the liquid is removed from the contiguous surfaces, with the proviso that the internal temperature of the articles of polymer does not reach the heat distortion temperature of the polymer.

3. The method according to claim 1 wherein the liquid has a solubility parameter of at least 12 at 25° C.

4. The method according to claim 3 wherein the liquid is water.

5. The method according to claim 3 wherein the liquid is an aliphatic alcohol having from 1 to 5 carbon atoms.

6. The method according to claim 1 wherein the polymer is polystyrene.

7. The method according to claim 1 wherein the articles are sheets of polymer having thicknesses ranging from about 0.3 to about 20 mils.

References Cited

UNITED STATES PATENTS 3,357,874  12/1967  Kennedy, Jr.  156—308

REUBEN EPSTEIN, Primary Examiner